United States Patent [19]

Ishihara et al.

[11] Patent Number: 5,282,206
[45] Date of Patent: Jan. 25, 1994

[54] SYNCHRONIZATION CIRCUIT FOR ESTABLISHING FRAME SYNCHRONISM USING POINTERS IN A DIGITAL TRANSMISSION SYSTEM

[75] Inventors: Tomohiro Ishihara; Haruo Yamashita; Toshiyuki Sudo; Ryuichi Kondo; Takaaki Wakisaka, all of Kawasaki, Japan

[73] Assignee: Fujitsu Limited, Kawasaki, Japan

[21] Appl. No.: 984,925

[22] Filed: Dec. 3, 1992

[30] Foreign Application Priority Data

Dec. 3, 1991 [JP] Japan .................................. 3-319398

[51] Int. Cl.$^5$ .............................................. H04J 3/06
[52] U.S. Cl. .................... 370/105.1; 370/105.4; 375/114; 375/116
[58] Field of Search ............... 370/100.1, 102, 105.1, 370/105.4, 106, 94.1, 94.2; 375/106, 111, 114, 116

[56] References Cited

U.S. PATENT DOCUMENTS

| | | | |
|---|---|---|---|
| 4,453,260 | 6/1984 | Inagawa et al. | 375/116 |
| 4,748,623 | 5/1988 | Fujimoto | 370/100.1 |
| 4,984,238 | 1/1991 | Watanabe et al. | 370/105.1 |
| 5,210,754 | 5/1993 | Takahashi et al. | 370/105.4 |

OTHER PUBLICATIONS

CCITT Recommendations G.707, G.708 and G.709 (Melbourne, 1988).

Primary Examiner—Douglas W. Olms
Assistant Examiner—Alpus H. Hsu

[57] ABSTRACT

A synchronous circuit includes a first circuit block operating in synchronism with a first clock signal, and a second circuit block operating in synchronism with a second clock signal having a frequency lower than that of the first clock signal. The first circuit block includes a frame synchronizing circuit for detecting a synchronous pattern contained in input data having a frame format having a supervisory control data part and an information part, the supervisory control data part including pointer information indicative of a beginning of the information part. The first circuit block includes a synchronizing unit for generating, from the synchronous pattern, a synchronizing control signal for synchronizing the operation of the second circuit block with the operation of the first circuit block. The first circuit block includes a pulse generator for generating a first frame pulse signal from the first clock signal. The second circuit block includes an information part detecting unit for generating a second frame pulse signal having a frequency lower than that of the first frame pulse signal from the second clock signal and the synchronizing control signal, the first frame pulse signal being synchronized with the beginning of the information part.

18 Claims, 11 Drawing Sheets

SYNCHRONIZATION CIRCUIT FOR ESTABLISHING FRAME SYNCHRONISM USING POINTERS IN A DIGITAL TRANSMISSION SYSTEM

BACKGROUND OF THE INVENTION

1. Field of the Invention

The present invention generally relates to synchronization circuits, and more particularly to a synchronization circuit in which a frame synchronization is established using a pointer.

2. Description of the Related Art

Figure 1:
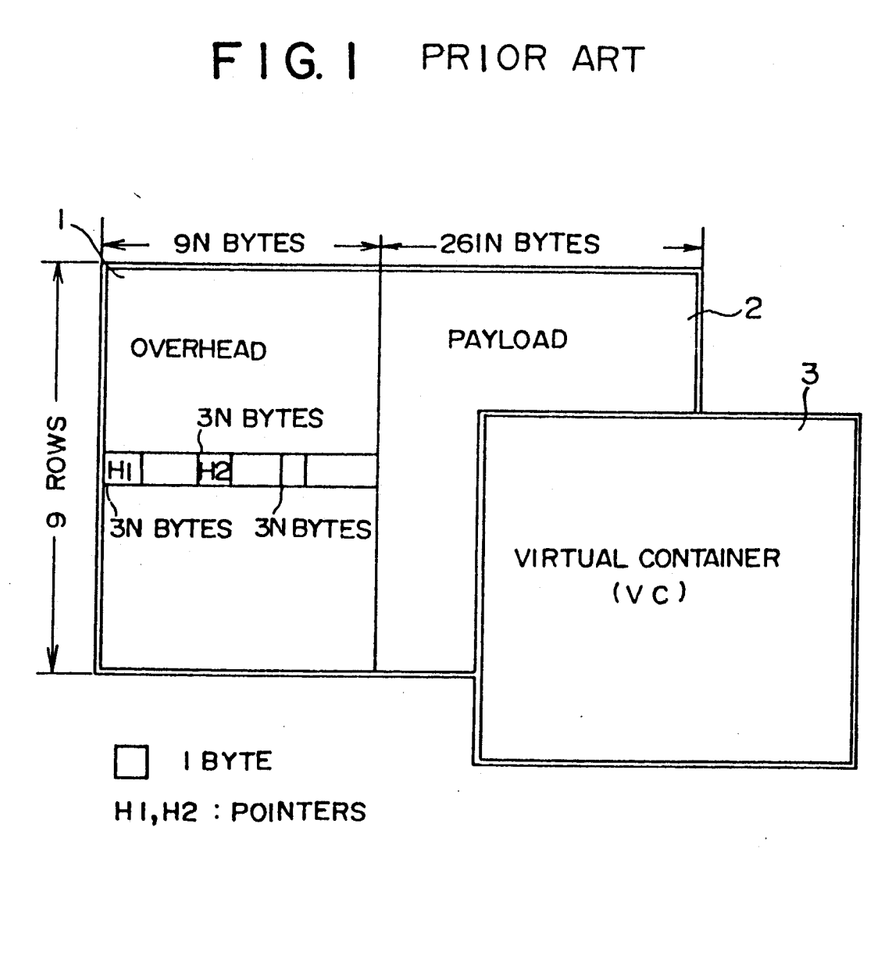
FIG. 1 is a block diagram of a data format prescribed in the CCITT Recommendations.

A synchronization multiplexing system is widely employed in the field of digital transmission systems. For example, the CCITT recommends the frame format shown in FIG. 1 in an optical digital transmission system (see the CCITT Recommendations G. 707, 708 and 709). The frame format shown in FIG. 1 is used to multiplex pieces of 50 Mbps digital data so as to transmit multiplexed data at a bit rate of a few Gbps. One frame consists of nine rows and has an overhead 1 and a payload 2. Each of the nine rows has 9N-byte overhead data, and 261N-byte payload data, wherein N is an arbitrary integer. Supervisory control information is contained in the overhead 1, and information to be actually transmitted, that is, a virtual container (VC) 3 is contained in the payload 2.

The beginning position of the virtual container is indicated by pointers H1 and H2 included in the overhead 1. The frame, format shown in FIG. 1 is the format of a frame transmitted at a bit rate equal to N times 155.52 Mbps, and is called an STM(Synchronous Transport Module)-N. According to the aforementioned CCITT Recommendations, a plurality of virtual containers 3 are included in the payload 2 of the STM-N frame format, and a plurality of pairs of pointers, such as pointers H1 and H2, are included in the overhead 1 of the STM-N frame format. Alternatively, according to the CCITT Recommendations, one virtual container 3 may be included in the payload 2 of the STM-N frame format, and a pair of pointers may be included in the overhead 1. The latter frame format is called concatenation, and the present invention is concerned with the concatenation frame format.

Figure 2:
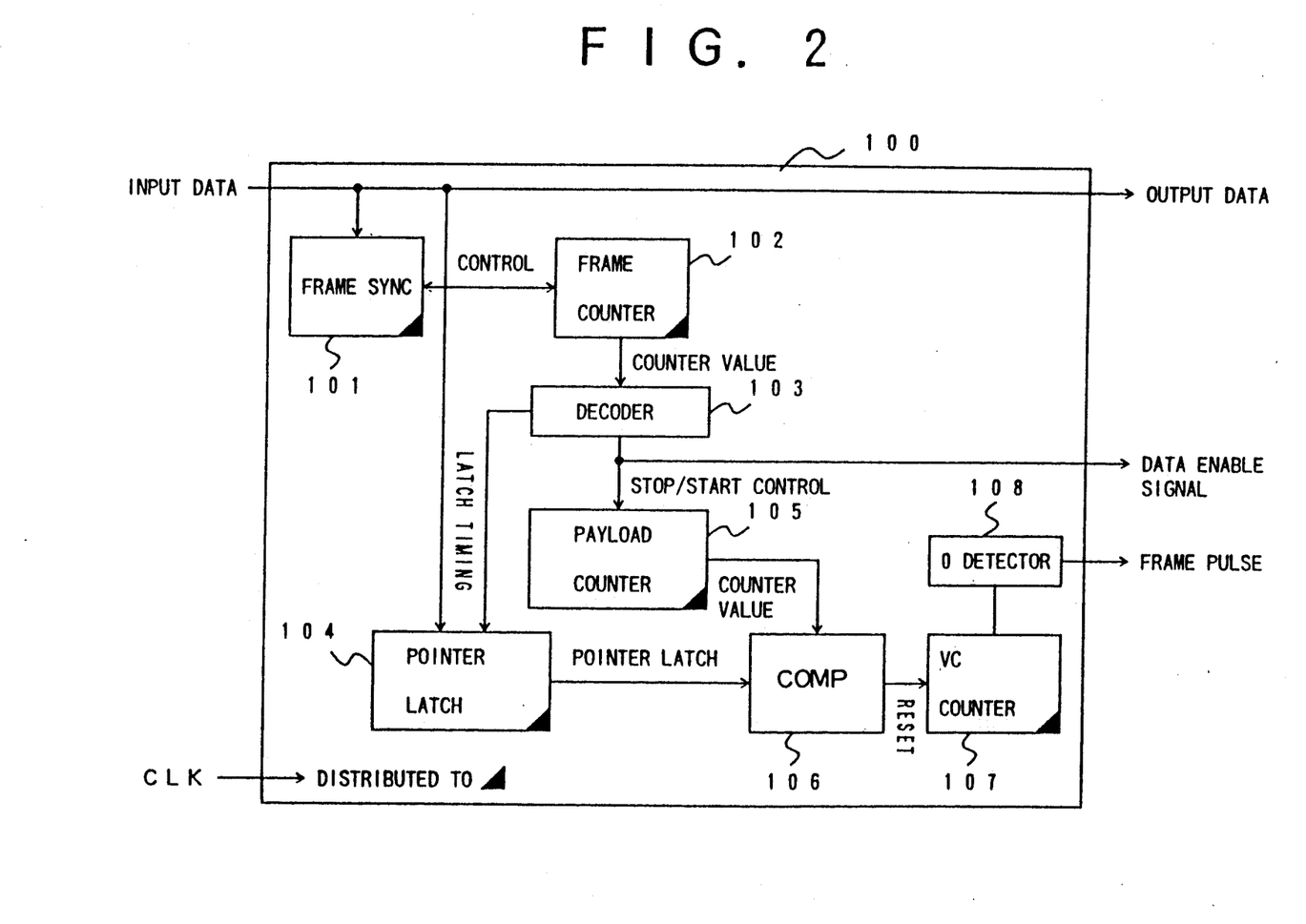
FIG. 2 is a block diagram of a synchronization circuit.

FIG. 2 is a block diagram of a synchronization circuit in a digital transmission system. The synchronization circuit shown in FIG. 2 comprises a frame synchronization unit 101, a frame counter 102, a decoder 103, a pointer latch 104, a payload counter 105, a comparator 106, a VC counter 107, and a zero detector 108. A clock signal shown in (A) of FIG. 3 is applied to the frame synchronizing unit 101, the frame counter 102, the pointer latch 104, the payload counter 105 and the VC counter 107.

Figure 3:
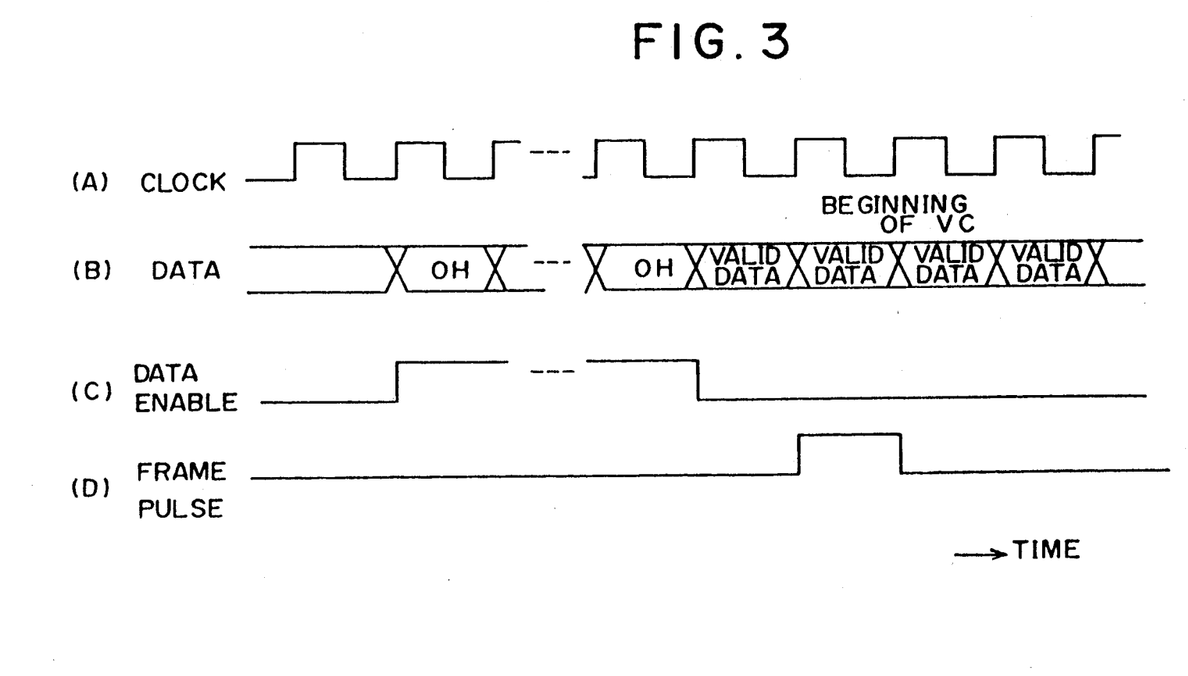
FIG. 3 is a timing chart showing the operation of the synchronization circuit shown in FIG. 2.

As shown in (B) of FIG. 3, data transmitted in the frame format shown in FIG. 1 is applied to the frame synchronizing unit 101, which detects a framing pattern contained in the overhead 1. In (B) of FIG. 3, "OH" indicates the overhead 1. In response to the detection of the framing pattern, the frame counter 102 starts to count the number of bytes in the STM-N frame. The decoder 103 decodes the counter value of the frame counter 102, and generates a data enable signal shown in (C) of FIG. 3. The data enable signal causes the payload counter 105 to operate only while the payload 2 is being received. Further, the decoder 103 generates a latch timing pulse when the decoder 103 decodes the counter value indicated by the pointers H1 and H2. The latch timing pulse generated by the decoder 103 is applied to the pointer latch 104.

The pointer latch 104 latches the pointers H1 and H2 contained in the overhead 1 with the latch timing pulse, and outputs them to the comparator 106. The comparator 106 outputs a reset pulse to the VC counter 107 when the counter value of the payload counter 105 coincides with the pointer value latched in the pointer latch 104. In response to receipt of the reset pulse, the zero detector 108 detects a counter value of zero in the VC counter 107, and generates a frame pulse. As shown in (D) of FIG. 3, the frame pulse indicates the beginning position of the virtual container VC of the input data. The VC counter 107 counts the number of bytes included in the virtual container VC, and is reset every one-frame period.

It is required that the synchronization circuit operates at higher speeds as the frame bit rate increases. For example, a high-speed LSI circuit is required to handle a high-bit-rate signal having a bit rate of 622.08 Mbps (STM-4) or 2.48832 Gbps (STM-16). As is well known, compound semiconductor devices, such as GaAs devices, are capable of operating at speeds higher than CMOS devices. However, the compound semiconductor devices need more energy than the CMOS devices. In a case where the synchronous circuit shown in FIG. 2 is constructed using compound semiconductor devices, it consumes a large amount of energy.

SUMMARY OF THE INVENTION

It is an object of the present invention to provide a synchronization circuit in which the above disadvantage is eliminated.

A more specific object of the present invention is to provide a synchronization circuit that does not consume a large amount of energy.

The above objects of the present invention are achieved by a synchronization circuit including a first block operating in synchronism with a first clock signal, and a second block operating in synchronism with a second clock signal having a frequency lower than that of the first clock signal. The first block includes a frame synchronization circuit for detecting a framing pattern contained in input data having a frame format having a supervisory control data part and an information part, the supervisory control data part including pointer information indicative of a beginning of the information part. The first block includes a synchronization unit for generating, from the framing pattern, a synchronizing control signal for synchronizing the second block operation with the first block operation. The first block includes a pulse generator for generating a first frame pulse signal from the first clock signal and a second frame pulse signal having a frequency lower than that of the first frame pulse signal. The second block includes an information part detecting unit for generating the second frame pulse signal from the second clock signal and the synchronizing control signal, the first frame pulse signal being synchronized with the beginning of the information part.

BRIEF DESCRIPTION OF THE DRAWINGS

Other objects, features and advantages of the present invention will become apparent from the following detailed description when read in conjunction with the accompanying drawings, in which.

DESCRIPTION OF THE PREFERRED EMBODIMENTS

Figure 4:
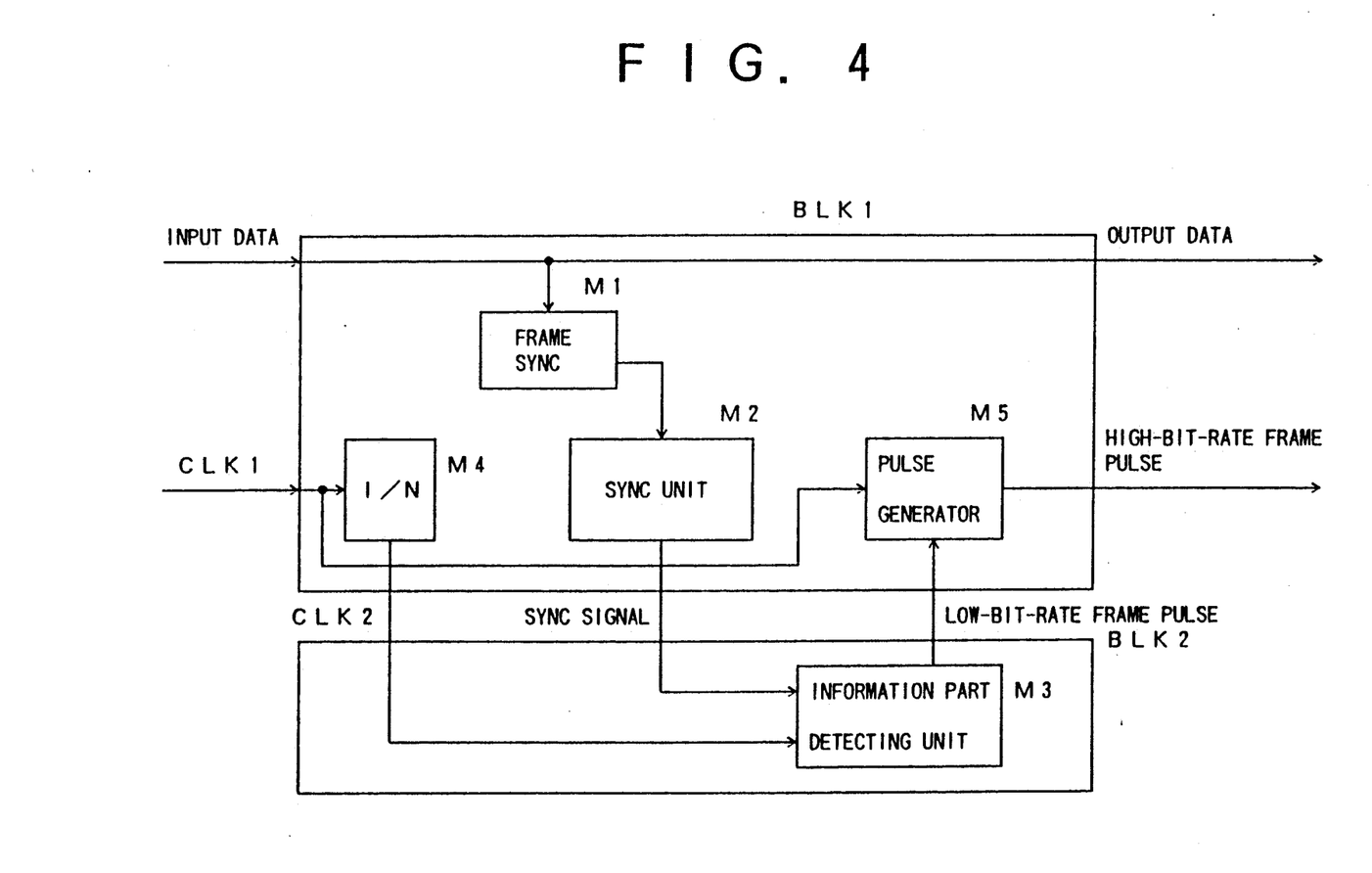
FIG. 4 is a block diagram of an overview of a synchronization circuit of the present invention.

FIG. 4 is a block diagram showing an overview of the present invention. A synchronization circuit shown in FIG. 4 comprises a high-bit-rate circuit block BLK1 serving as a supervisory control data unit, and a low-bit-rate circuit block BLK2 serving as an information part unit. The high-bit-rate circuit block BLK1 operates in synchronism with a first clock signal CLK1, and the low-bit-rate circuit block BLK2 operates in synchronism with a second clock signal CLK2 having a frequency equal to 1/N times the frequency of the first clock signal CLK1, wherein N is an integer equal to or greater than 2.

The high-bit-rate circuit block BLK1 is made up of a frame synchronization unit M1, a synchronization unit M2, a 1/N frequency divider M4, and a pulse generator M5. The low-bit-rate circuit block BLK2 comprises an information part detecting unit M3. The frame synchronizing unit M1 detects a framing pattern contained in input data applied to the high-bit-rate circuit block BLK1. The input data has a predetermined frame format having an information part indicated by a pointer contained in the input data. The synchronizing unit or block M2 generates a synchronizing control signal that synchronizes the low-bit-rate circuit block BLK2 with the high-bit-rate circuit block BLK1 in accordance with the framing pattern detected by the frame synchronizing unit M1. The synchronizing control signal is applied to the information part detection unit M3. The 1/N frequency divider M4 externally receives the first clock signal CLK1 and generates a second clock signal CLK2 from the first clock signal CLK1. The second clock signal CLK2 is applied to the information part detection unit M3. The first clock signal CLK1 is also applied to the pulse generator M5. The information part detection unit M3 detects the beginning of the information part of the input data on the basis of the second clock signal CLK2 and the synchronizing control signal. The information part corresponds to, for example, the virtual container shown in FIG. 1. The information part detection unit M3 generates a low-bit-rate frame pulse signal when it detects the beginning of the information part. The pulse generator M5 receives the first clock signal CLK1 and the low-bit-rate frame pulse signal issued by the information part detection unit M3, and generates a high-bit rate frame pulse signal in synchronism with the beginning of the information part. The high-bit-rate frame pulse signal has a pulse width less than the period of the first clock signal CLK1.

Figure 5:
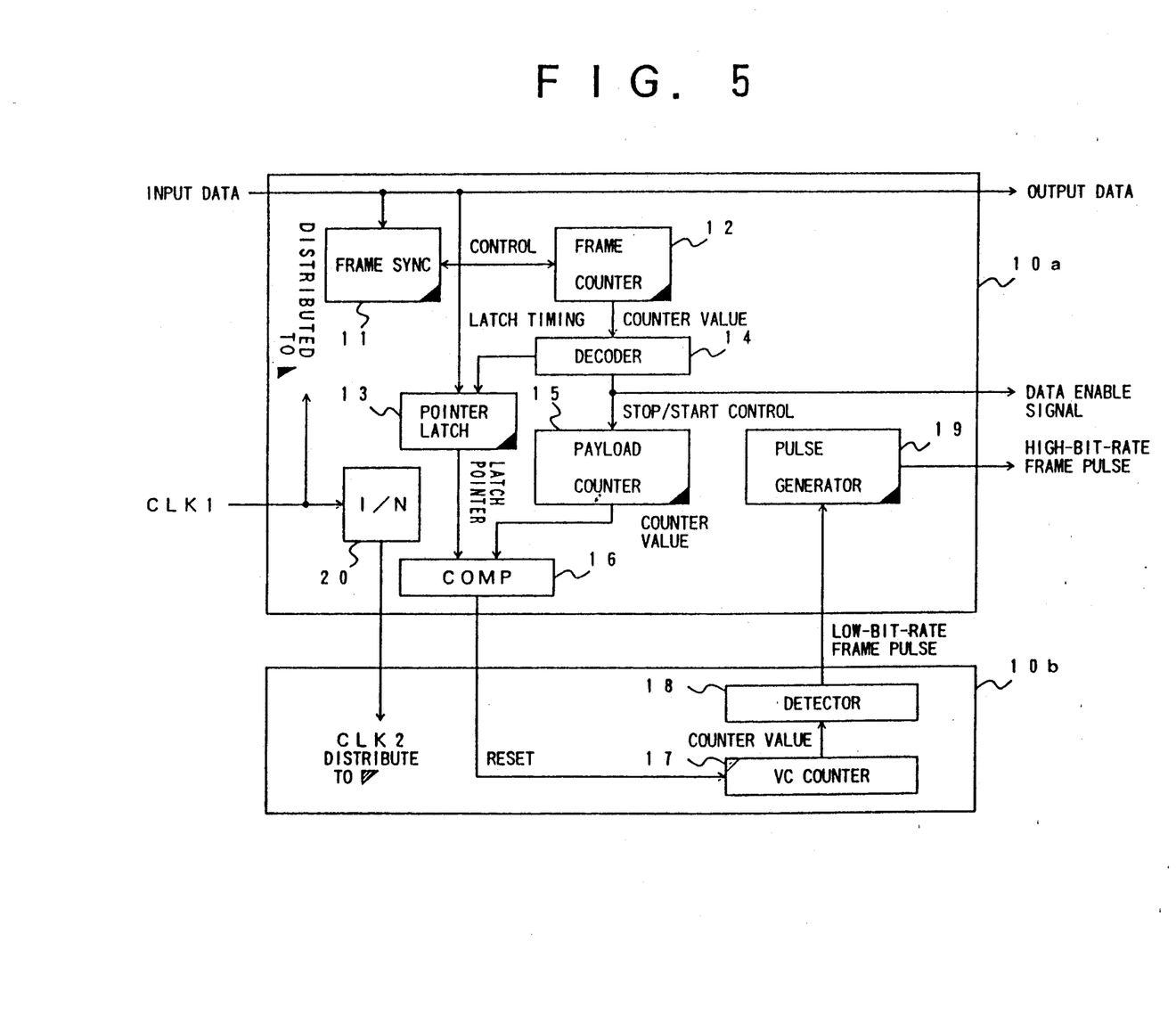
FIG. 5 is a block diagram of a first embodiment of the present invention.

FIG. 5 is a block diagram of a synchronization circuit according to a first embodiment of the present invention. The synchronization circuit shown in FIG. 5 comprises a high-bit-rate circuit block 10a, and a low-bit-rate circuit block 10b. The high-bit-rate circuit block 10a operates in synchronism with the above-mentioned first clock signal CLK1, and the low-bit-rate circuit block 10b operates in synchronism with the second clock signal CLK2 having a frequency equal to 1/N times the frequency of the first clock signal CLK1.

The high-bit-rate circuit block 10a comprises a frame synchronization circuit 11, a frame counter 12, a pointer latch 13, a decoder 14, a payload counter 15, a comparator 16, a pulse generator 19, and a 1/N frequency divider 20. The low-bit-rate circuit block 10b comprises a VC counter 17, and a detector 18.

Figure 6:
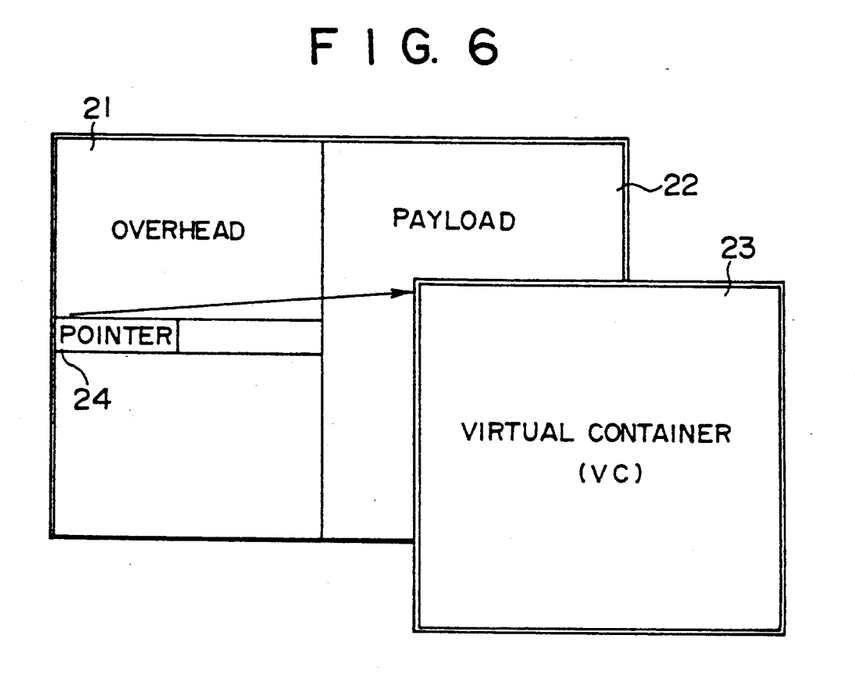
FIG. 6 is a diagram showing a frame format of input data applied to the synchronization circuit shown in FIG. 4.

The input data applied to the high-bit-rate data block 10a is multiplexed digital data, which has a frame format as shown in FIG. 6. The frame format shown in FIG. 6 has an overhead 21, and a payload 22 corresponding to the aforementioned information part. The overhead 21 contains supervisory control data, and the payload 22 contains information to be transmitted. The frame beginning position of a virtual container (VC) 23, which is information in the payload 22 to be transferred, is indicated by a pointer 24 contained in the overhead 21. The pointer value of the pointer 24 indicates the frame beginning position of the virtual container 23 of the next frame. The frame format used in the present invention is, for example, the frame format prescribed in the CCITT Recommendations G. 707, 708 and 709. According to the above CCITT Recommendations, the frame format consists of nine rows, each of which contains 9N-byte overhead data, and 261N-byte payload information. In the format shown in FIG. 6, one pointer 24 is provided in the overhead 21.

The VC counter 17 indicates the counter value that changes in synchronism with the second clock signal CLK2 generated by the 1/N frequency divider 20. More particularly, the VC counter 17 counts the number of bytes in the virtual container 23, and repeatedly changes from "0" to "(9×261N−1)". The detector 18 detects the counter value immediately prior to a counter value of zero, that is, "(9×261N−1), and generates a low-bit-rate frame pulse signal. The pulse generator 19 receives the first clock signal CLK1 and the low-bit-rate frame pulse signal, and generates a high-bit-rate frame pulse signal having a pulse width less than the period of the first clock signal CLK1.

Figure 7:
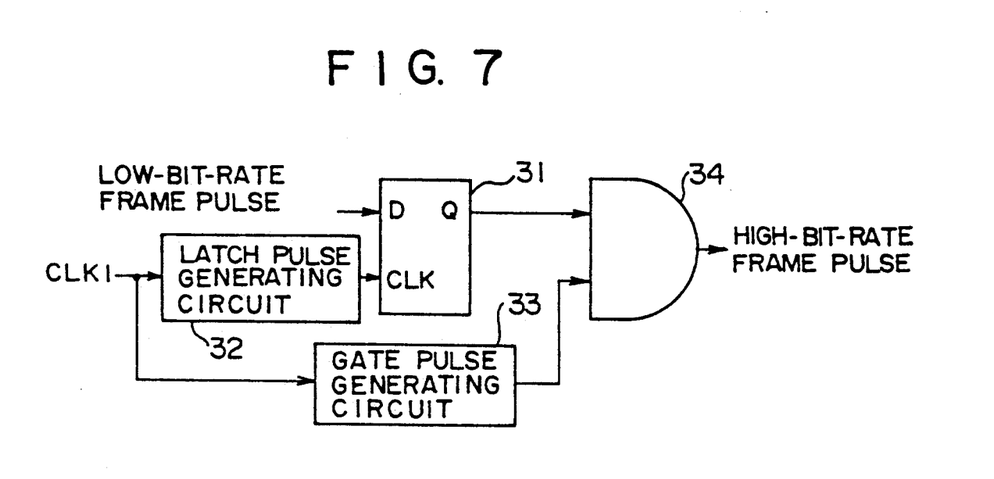
FIG. 7 is a block diagram of a pulse generator shown in FIG. 5.

FIG. 7 is a block diagram of the pulse generator 19, which comprises a D-type flip-flop 31, a latch pulse generator 32, a gate pulse generator 33 and an AND gate 34. The low-bit-rate frame pulse signal generated by the detector 18 is applied to a data input terminal D of the D-type flip-flop 31. The first clock signal CLK1 is applied to the input terminal of the latch pulse generator 32, which generates a latch pulse signal applied to a clock terminal CLK of the flip-flop 31.

Figure 8:
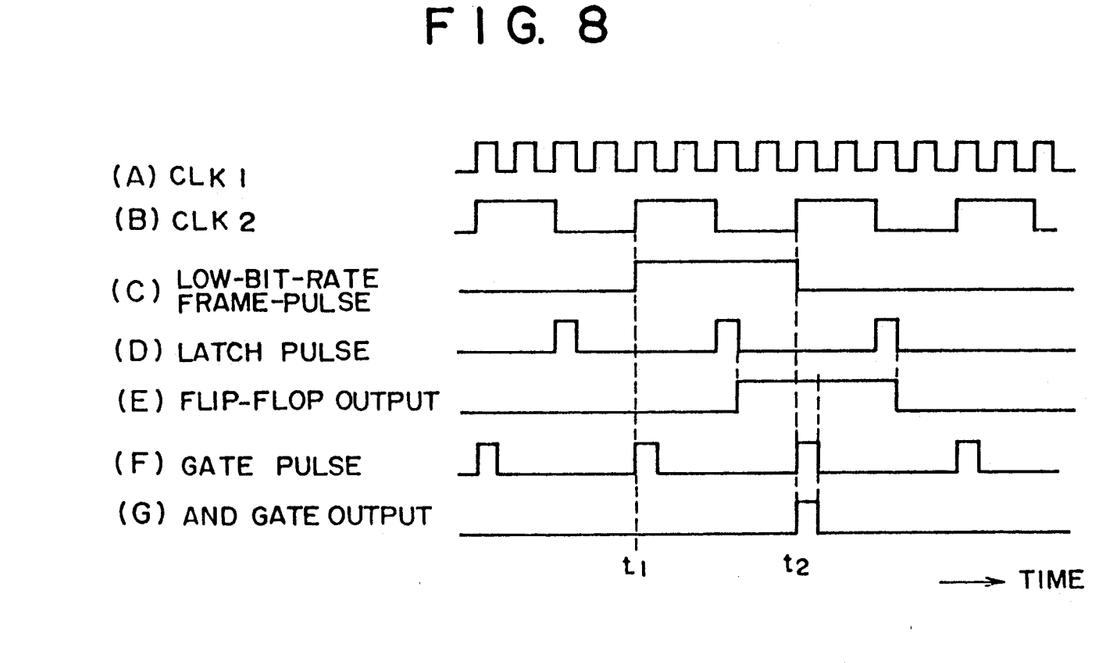
FIG. 8 is a timing chart showing the operation of the pulse generator shown in FIG. 7.

FIG. 8-(A) shows the first clock signal CLK1, and FIG. 8-(B) shows the second clock signal CLK2. FIG.

counter 17 and the detector 18. The payload counter 15' counts the number of bytes every predetermined number of bytes based on the frequency of the second clock signal CLK2. Hence, the synchronization circuit shown in FIG. 10 consumes less energy than the synchronization circuit shown in FIG. 5.

Figure 11:
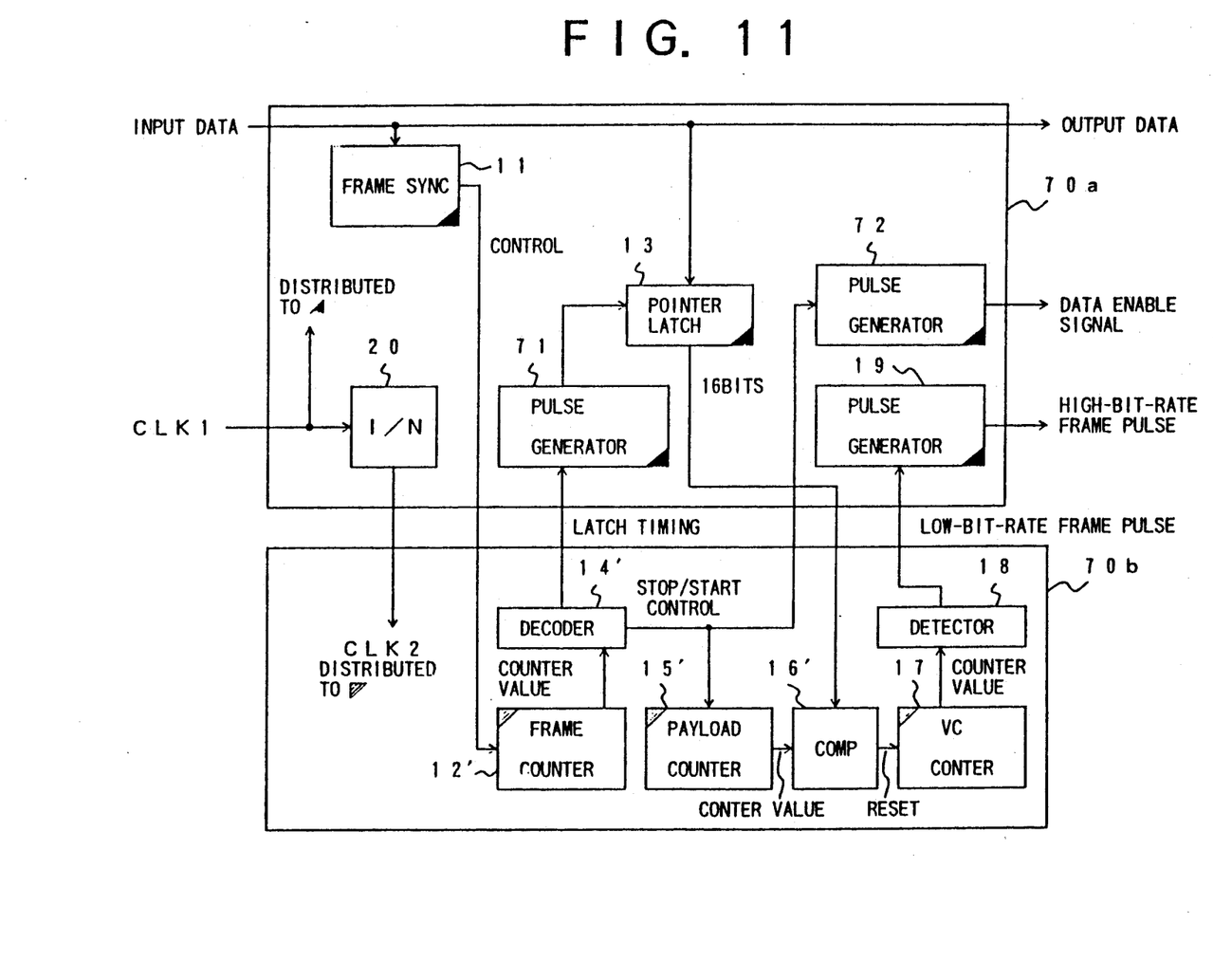
FIG. 11 is a block diagram of a third embodiment of the present invention.

FIG. 11 is a block diagram of a third embodiment of the present invention. In FIG. 11, parts that are the same as parts shown in the previously described figures are given the same reference numbers. A synchronization circuit shown in FIG. 11 comprises a high-bit-rate operation circuit block 70a operating in synchronism with the first clock signal CLK1, and a low-bit rate operation circuit block 70b operating in synchronism with the second clock signal CLK2. The high-bit-rate operation block 70a comprises a pulse generator 71 and a pulse generator 72 in addition to the frame synchronization circuit 11, the pointer latch 13, the pulse generator 19, and the 1/N frequency divider 20. The low-bit-rate operation block 70b comprises a frame counter 12' and a decoder 14' in addition to the payload counter 15', the comparator 16', the VC counter 17 and the detector 18.

The frame counter 12' counts the number of pulses of the second clock CLK2. The decoder 14' decodes the counter value of the frame counter 12', and outputs a latch timing signal to the pulse generator 71 provided in the high-bit-rate operation block 70a. Further, the decoder 14' outputs a stop/start control signal to the payload counter 15' and the pulse generator 72. The pulse generators 71 and 72 are configured in the same manner as the pulse generator 19, and respectively generate, in synchronism with the respective input pulse signals, pulse signals having a pulse width less than that of the first clock signal CLK1. The pulse signal output from the pulse generator 71 is applied, as a latch timing signal, to the pointer latch 13. The pulse signal output from the pulse generator 72 is applied, as a data enable signal, to a circuit (not shown) of the next stage.

The frame counter 12' counts the number of bytes every predetermined number of bytes based on the frequency of the second clock signal CLK2. The pointer latch 13 operates every byte, and hence the pulse generator 71 converts the pulse width of the output signal of the decoder 14' into a pulse width equal to that of the first clock signal CLK1. The synchronous circuit shown in FIG. 11 consumes less energy than the synchronization circuit shown in FIG. 10.

Figure 12:
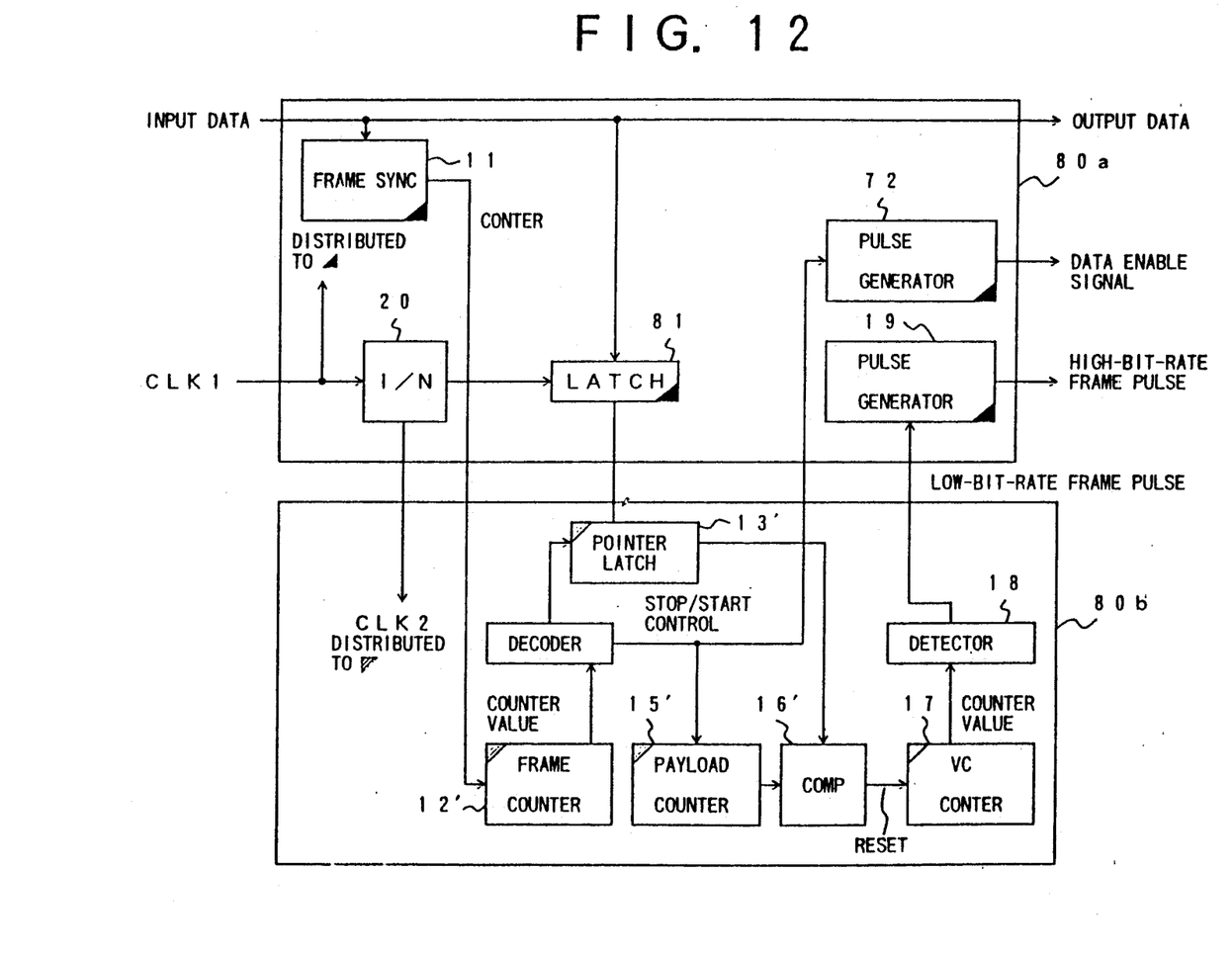
FIG. 12 is a block diagram of a fourth embodiment of the present invention.

FIG. 12 is a block diagram of a fourth embodiment of the present invention. A synchronous circuit shown in FIG. 12 comprises a high-bit-rate operation circuit block 80a, and a low-bit-rate operation circuit block 80b. The high-bit-rate operation circuit block 80a comprises a latch 81 in addition to the frame synchronization circuit 11, the pulse generator 19, the 1/N frequency divider 20 and the pulse generator 72. The low-bit-rate operation circuit block 80b comprises a pointer latch 13' in addition to the configuration of the block 70b shown in FIG. 11.

The pointer address value is indicated by the pointers H1 and H2, which are spaced apart from each other by a predetermined number of bytes. Hence, the latch 81 latches the input data in synchronism with the second clock signal CLK2 generated by the 1/N frequency divider 20, and the pointer latch 13' latches the input data in synchronism with the latch timing signal generated by the decoder 14'. The synchronization circuit shown in FIG. 12 consumes less energy than the synchronization circuit shown in FIG. 11.

The data enable signal and the frame pulse signal generated by the synchronization circuit of the present invention are applied to a circuit of the next stage. For example, the circuit of the next-stage separates subchannels contained in the virtual container 23.

The present invention is not limited to the specifically disclosed embodiments, and variations and modifications may be made without departing from the scope of the present invention.

What is claimed is:

1. A synchronization circuit for a digital transmission system, the circuit comprising:
   a first circuit block inputted with and operating in synchronism with a first clock signal; and
   a second circuit block inputted with and operating in synchronism with a second clock signal having a frequency lower than that of the first clock signal,
   wherein the first circuit block comprises:
   frame synchronizing means for detecting a framing pattern contained in input data having a frame format having a supervisory control data part and an information part, the supervisory control data part including pointer information indicative of a beginning of the information part;
   synchronizing means, coupled to the frame synchronizing means, for generating, from the framing pattern, a synchronizing control signal for synchronizing operation of the second circuit block with operation of the first circuit block; and
   pulse generating means, coupled to the synchronizing means, for generating a first frame pulse signal from the first clock signal, and
   wherein the second circuit block comprises information part detecting means, coupled to the synchronizing means and the pulse generating means, for generating from the second clock signal and the synchronizing control signal a second frame pulse signal having a frequency lower than that of the first frame pulse signal, and transmitting the second frame pulse signal to the pulse generating means, the first frame pulse signal being synchronized with the beginning of the information part.

2. The synchronization circuit as claimed in claim 1, wherein the information part detecting means comprises counter means for counting a number of pulses of the second clock signal after receiving the synchronizing control signal.

3. The synchronization circuit as claimed in claim 1, wherein the information part detecting means comprises means for generating the second frame pulse signal having a pulse width corresponding to a period of the first clock signal.

4. The synchronization circuit as claimed in claim 1, wherein the synchronizing means of the first circuit block comprises:
   first counter means, coupled to the frame synchronizing means, for counting a number of bytes in a frame of the input data in accordance with the framing pattern;
   pointer information latch means, operatively coupled to the first counter means, for latching the pointer information in accordance with a counter value indicated by the first counter means;
   second counter means, coupled to the first counter means, for counting a number of bytes in the infor- 8-(C) shows the low-bit-rate frame pulse signal generated by the detector 18, and FIG. 8-(D) shows the latch pulse signal generated by the latch pulse generator 32. The pulse width of the low-bit rate frame pulse signal corresponds to the period of the second clock signal CLK2.

The first clock signal CLK1 is applied to the gate pulse generator 33, which generates a gate pulse signal shown in (E) of FIG. 8. The waveform of each pulse of the gate pulse signal rises in synchronism with the rise of each pulse of the second clock signal CLK2, and a pulse width equal to that of the first clock signal CLK1. The gate pulse signal generated by the gate pulse generator 33 is applied to the AND gate 34. The output signal of the flip-flop 31 shown in (E) of FIG. 8 generated via its output terminal Q is applied to the AND gate 34. The output pulse signal of the flip-flop 31 is obtained by latching the low-bit-rate frame pulse in synchronism with the trailing edge of the latched pulse. The AND gate 34 executes a logical AND operation on the signals shown in (E) and (F) of FIG. 8, and generates the high-bit-rate frame pulse signal shown in (G) of FIG. 8. The pulse width of the high-bit-rate frame signal is equal to the pulse width of the first clock signal CLK1. In this manner, the high-bit-rate frame signal is generated from the low-bit-rate frame signal.

The operation of the first embodiment shown in FIG. 5 will now be described with reference to a timing chart of FIG. 9. The input data having the frame format shown in FIG. 6 is applied to the high-bit-rate circuit block 10a in synchronism with the first clock signal CLK1. As shown in (A) of FIG. 9, the first clock signal CLK1 is a rectangular wave signal. Each one byte of the input data is schematically illustrated in (C) of FIG. 9. The input data is synchronized with the first clock signal CLK1.

The frame synchronization circuit 11 detects the framing pattern contained in the overhead 21 of the input data, and outputs a detection signal to the frame counter 12. In response to receipt of the detection signal, the frame counter 12 starts to count the number of pulses of the first clock signal CLK1. As has been described previously, the first clock signal CLK1 is synchronized with the period of one byte of the input data, and hence the counter value of the frame counter 12 indicates the number of bytes in the frame.

Figure 9:
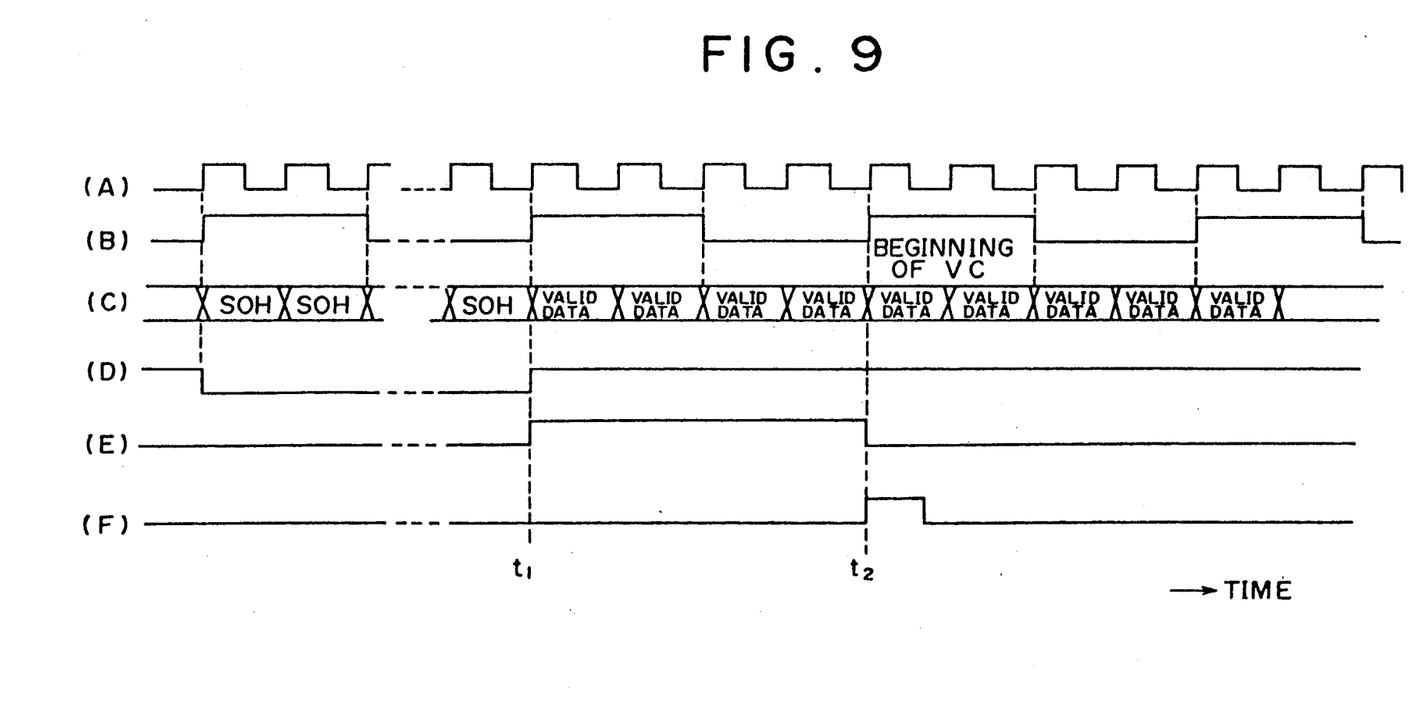
FIG. 9 is a timing chart showing the operation of the first embodiment of the present invention.

The decoder 14 decodes the counter value of the frame counter 12, and generates a data enable signal shown in (D) of FIG. 9. The data enable signal is maintained at a first level during the period of transmission of the payload 22 consisting of 261×N bytes per row, and is maintained at a second level during the period of transmission of the overhead 21 consisting of 9×N bytes per row. The data enable signal is applied, as a stop/start control signal, to the payload counter 15, which is made to operate during the period of transmission of the payload 22. Further, the decoder 14 detects the counter value indicating the position of the pointer 24 included in the overhead 21, and outputs the latch timing pulse to the pointer latch 13.

The pointer latch 13 latches the input data in synchronism with the latch timing pulse signal shown in (D) of FIG. 8. Hence, the pointer latch 13 holds the pointer 24 contained in the overhead 21. The payload counter 15 is controlled so that it operates during the period of transmission of the payload 22. Hence, the counter value of the payload counter 15 indicates the number of bytes transmitted during the period of transmission of the payload 22.

The comparator 15 compares the pointer value with the counter value of the payload counter 15. When the values are equal to each other, the comparator 15 outputs a reset pulse signal to the VC counter 17. After the VC counter 17 is reset, the VC counter 17 starts to count the number of pulses of the second clock signal CLK2.

At time $t_1$ when the counter value of the VC counter 17 indicates "$(9 \times 261N - 1)$", the detector 18 generates the low-bit-rate frame signal shown in (E) of FIG. 9 and (C) of FIG. 8. The low-bit-rate frame signal changes from the high level to the low level at time $t_2$ one clock pulse after the second clock signal CLK2 (at this time, the counter value of the VC counter 17 becomes zero). Hence, as shown in (F) of FIG. 9 and (G) of FIG. 8, the pulse generator 19 generates the high-bit-rate frame pulse at time $t_2$ when the counter value of the VC counter 17 becomes zero. The high-bit-rate frame pulse has the pulse width equal to the pulse width of the first clock signal CLK1.

According to the first embodiment of the present invention, the high-bit-rate operation block 10a processes data for each byte in synchronism with the first clock signal CLK1, and the low-bit-rate operation block 10b, including the VC counter 17 and the detector 18, operates in synchronism with the second clock signal CLK2 having a frequency equal to 1/N times that of the first clock signal CLK1. It will be noted that the VC counter 17 counts the number of bytes in the virtual container 23 every predetermined number of bytes. According to the CCITT Recommendations, the address value indicated by the pointers H1 and H2 changes every 4 or 16 bytes (N=4 or 16). Hence, the VC counter 17 counts the number of bytes in the virtual container 23 every 4 or 16 bytes. The low-bit-rate operation block 10b does not consume a large amount of energy.

Figure 10:
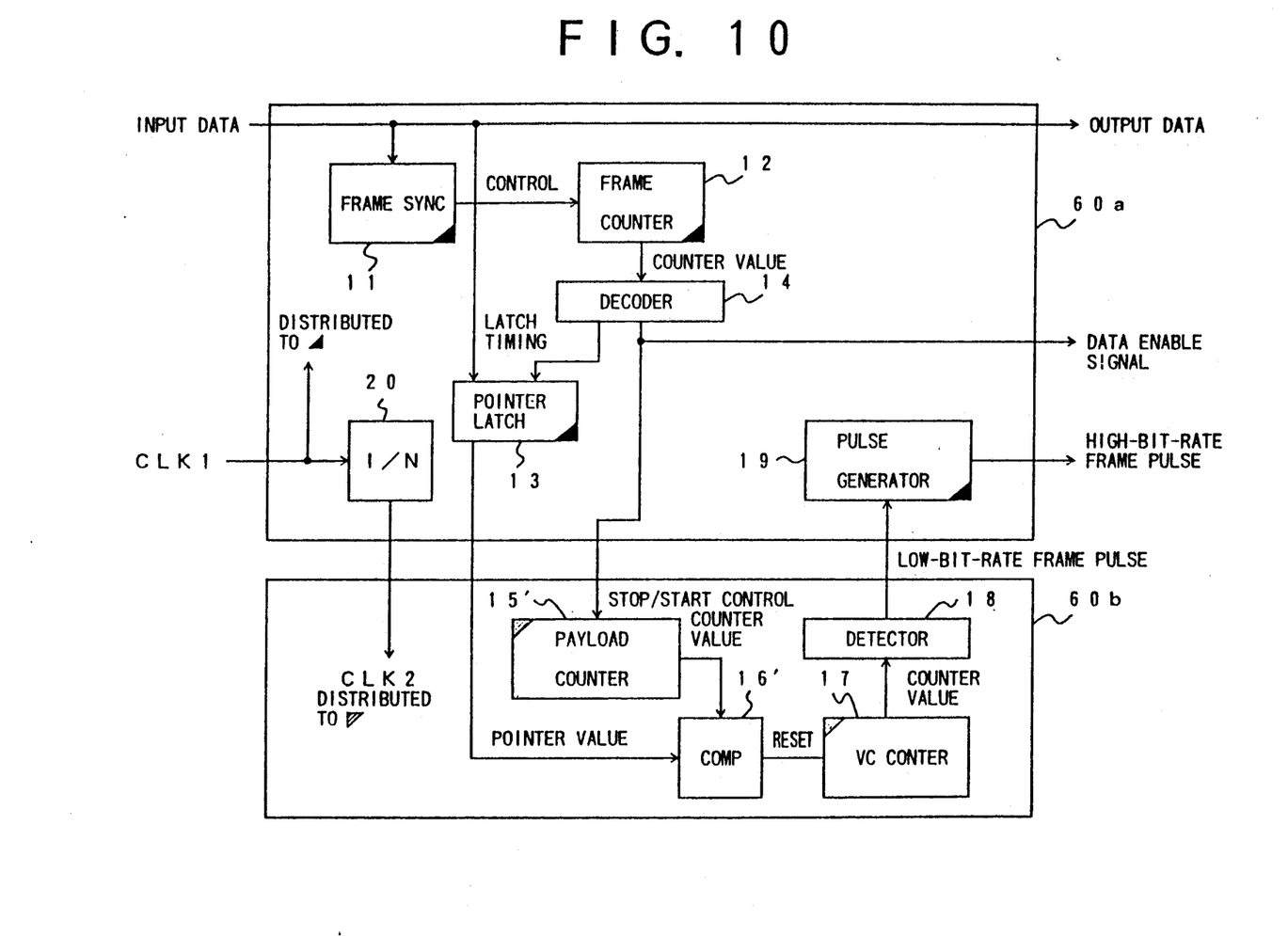
FIG. 10 is a block diagram of a second embodiment of the present invention.

A description will now be given of a second embodiment of the present invention with reference to FIG. 10, in which parts that are the same as parts shown in FIG. 5 are given the same reference numbers. A synchronous circuit shown in FIG. 10 comprises a high-bit-rate operation circuit block 60a, and a low-bit-rate operation circuit block 60b. The block 60a comprises the frame synchronization circuit 11, the frame counter 12, the pointer latch 13, the pulse generator 19 and the 1/N frequency divider 20. It should be noted that the payload counter 15 and the comparator 16 shown in FIG. 5 are not provided in the high-bit-rate operation circuit block 60a.

The low-bit-rate operation circuit block 60b comprises a payload counter 15', a comparator 16', the VC counter 17 and the detector 18. The payload counter 15' counts the number of pulses of the second clock signal CLK2 during only the period of transmission of the payload 22. The comparator 16' compares the counter value of the payload counter 15' with the pointer value latched in the pointer latch 13. When the difference between the above values becomes equal to a predetermined value (that is, when the counter value of the payload counter 15' is substantially equal to the pointer value in the pointer latch 13), the comparator 16' outputs the reset pulse signal to the VC counter 17.

According to the second embodiment of the present invention, the payload counter 15' and the comparator 16' operate at the low bit rate in addition to the VC mation part of the input data in synchronism with the first clock signal;

comparator means, coupled to the pointer information latch means and the second counter means, for detecting whether or not a difference between a counter value indicated by the second counter means and a value indicated by the pointer information latch means has become equal to a predetermined value and for generating the synchronizing control signal when detecting said difference.

5. The synchronization circuit as claimed in claim 4, further comprising frequency divider means for generating the second clock signal from the first clock signal.

6. The synchronization circuit as claimed in claim 4, wherein the frequency divider means is provided in the first circuit block.

7. The synchronization circuit as claimed in claim 1, wherein the synchronizing means of the first circuit block comprises:

first counter means, coupled to the frame synchronizing means, for counting a number of bytes in a frame of the input data in accordance with the synchronous pattern, and pointer information latch means, operatively coupled to the first counter means, for latching the pointer information in accordance with a counter value indicated by the first counter means, and wherein the second circuit block further comprises:

second counter means, coupled to the first counter means, for counting a number of bytes in the information part of the input data in synchronism with the second clock signal, and comparator means, coupled to the pointer information latch means and the second counter means, for detecting whether or not a difference between a counter value indicated by the second counter means and a value indicated by the pointer information latch means has become equal to a predetermined value and for generating the synchronizing control signal when detecting said difference.

8. The synchronization circuit as claimed in claim 7, further comprising frequency divider means for generating the second clock signal from the first clock signal.

9. The synchronization circuit as claimed in claim 7, wherein the frequency divider means is provided in the first circuit block.

10. The synchronization circuit as claimed in claim 1, wherein the second circuit block comprises first counter means, coupled to the frame synchronizing means, for counting, in synchronism with the second clock signal, a number of bytes in a frame of the input data in accordance with the synchronous pattern and the synchronizing means of the first circuit block comprises pointer information latch means, operatively coupled to the first counter means, for latching the pointer information in accordance with a latch timing signal, and wherein the second circuit block further comprises:

second counter means, coupled to the first counter means, for counting a number of bytes in the information part of the input data in synchronism with the second clock signal, and comparator means, coupled to the pointer information latch means and the second counter means, for detecting whether or not a difference between a counter value indicated by the second counter means and a value indicated by the pointer information latch means has become equal to a predetermined value and for generating the synchronizing control signal when detecting said difference.

11. The synchronization circuit as claimed in claim 10, wherein the first circuit block comprises means for generating a latch timing signal on the basis of a counter value indicated by the first counter means, said latch timing signal being synchronized with the first clock signal.

12. The synchronization circuit as claimed in claim 10, further comprising frequency divider means for generating the second clock signal from the first clock signal.

13. The synchronization circuit as claimed in claim 10, wherein the frequency divider means is provided in the first circuit block.

14. The synchronization circuit as claimed in claim 1, wherein the second circuit block comprises:

first counter means, coupled to the frame synchronizing means, for counting, in synchronism with the second clock signal, a number of bytes in a frame of the input data in accordance with the forming pattern;

pointer information latch means, operatively coupled to the first counter means, for latching the pointer information in accordance with a counter value indicated by the first counter means;

second counter means, coupled to the first counter means, for counting a number of bytes in the information part of the input data in synchronism with the second clock signal; and comparator means, coupled to the pointer information latch means and the second counter means, for detecting whether or not a difference between a counter value indicated by the second counter means and a value indicated by the pointer information latch means has become equal to a predetermined value and for generating the synchronizing control signal when detecting said difference.

15. The synchronization circuit as claimed in claim 14, further comprising frequency divider means for generating the second clock signal from the first clock signal.

16. The synchronization circuit as claimed in claim 14, wherein the frequency divider means is provided in the first circuit block.

17. The synchronous circuit as claimed in claim 1, and further comprising frequency divider means for generating the second clock signal from the first clock signal.

18. The synchronous circuit as claimed in claim 17, wherein the frequency divider means is provided in the first circuit block.

* * * * *